(12) United States Patent
Hoogerbrugge et al.

(10) Patent No.: US 10,726,108 B2
(45) Date of Patent: Jul. 28, 2020

(54) PROTECTING THE INPUT/OUTPUT OF MODULAR ENCODED WHITE-BOX RSA

(71) Applicant: NXP B.V., Eindhoven (NL)

(72) Inventors: Jan Hoogerbrugge, Helmond (NL); Wil Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/391,437

(22) Filed: Apr. 23, 2019

(65) Prior Publication Data
US 2019/0251233 A1 Aug. 15, 2019

Related U.S. Application Data

(60) Division of application No. 14/815,540, filed on Jul. 31, 2015, now Pat. No. 10,372,886, which is a continuation-in-part of application No. 14/704,083, filed on May 5, 2015, now abandoned.

(51) Int. Cl.
*G06F 21/14* (2013.01)
*G06F 21/62* (2013.01)
*H04L 9/30* (2006.01)

(52) U.S. Cl.
CPC ............ *G06F 21/14* (2013.01); *G06F 21/629* (2013.01); *H04L 9/302* (2013.01); *H04L 9/3066* (2013.01); *G06F 2221/0748* (2013.01); *H04L 2209/046* (2013.01)

(58) Field of Classification Search
CPC ......... G06F 21/14; G06F 7/725; H04L 9/3066
See application file for complete search history.

(56) References Cited

U.S. PATENT DOCUMENTS

| 6,876,745 | B1 * | 4/2005 | Kurumatani | G06F 7/725 380/28 |
| 7,966,499 | B2 * | 6/2011 | Kandanchatha | G06F 21/50 713/190 |
| 9,772,821 | B2 * | 9/2017 | Feix | G06F 7/725 |
| 2009/0097637 | A1 * | 4/2009 | Boscher | H04L 9/3066 380/28 |
| 2009/0180611 | A1 * | 7/2009 | Douguet | H04L 9/3066 380/30 |

* cited by examiner

*Primary Examiner* — Daniel B Potratz

(57) ABSTRACT

A method of obscuring the input and output of a modular exponentiation function, including: receiving modular exponentiation parameters including an exponent e having N bits and a modulus m; generating randomly a pre-multiplier; calculating a post-multiplier based upon the pre-multiplier, exponent e, and modulus m; multiplying an input to the modular exponentiation function by the pre-multiplier; performing the modular exponentiation function; and multiplying the output of the modular exponentiation function by the post-multiplier, wherein multiplying an input to the modular exponentiation function by the pre-multiplier, performing the modular exponentiation function, and multiplying the output of the modular exponentiation function by the post-multiplier are split variable operations.

6 Claims, 7 Drawing Sheets

US 10,726,108 B2

PROTECTING THE INPUT/OUTPUT OF MODULAR ENCODED WHITE-BOX RSA

CROSS-REFERENCE TO RELATED APPLICATIONS

This application is a divisional of U.S. application Ser. No. 14/815,540 filed Jul. 31, 2015 which was a continuation-in-part application of U.S. application Ser. No. 14/704,083, filed on May 5, 2015.

TECHNICAL FIELD

Various exemplary embodiments disclosed herein relate generally to hiding data values being processed and preventing an attacker from recovering the plain data values being processed. For example, array indexing may be done using modular encoded values to hide the index values. Further, a modular exponentiation function and an elliptic curve cryptography (ECC) point multiplication may be obscured. Also, the input and output to the modular exponentiation function and the ECC point multiplication function may be obscured.

BACKGROUND

Today software applications are widely used to provide various services to users. These software applications may be hosted on a variety of different devices, such as for example, mobile phones, personal computers, laptop computers, tablets, set top boxes, etc. Software applications are found in many systems in use by consumers or in industrial systems. Software applications are also found in smart cards and credit cards. Further, software applications may be implemented across networks such as the internet, where the software application runs on servers, and is accessed using various user devices. Many of these software applications require the use of security protocols to protect content, information, transactions, and privacy. Many software applications are run in environments where an attacker has complete control of the operation of the software application, and an attacker may attempt to reverse engineer the code of the software application in order to gain access to secure information or to even understand the operation of the software in order to reproduce or modify the functionality of the software application. An attacker may use various reverse engineering tools, such as for example, code analyzers and debuggers, to obtain information related to the software application. Accordingly, techniques have been developed to in order to make it hard for an attacker to reverse engineer software. One way to make reverse engineering of the code more difficult is code obfuscation. Code obfuscation seeks to create obfuscated code that is difficult for humans to understand. Code obfuscation may be used to conceal a software application's purpose or its logic, so as to prevent tampering or reverse engineering of the software application.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of obscuring software code including a data array and a plurality of operations, including: identifying, by a processor, a data array with an index to be obscured and an operation using the data array; permutating the identified data array using a permutating function; and replacing the identified operation using the permutated data array and equivalent encoded permutation function.

Various embodiments are described wherein replacing the operation using the permutated data array and equivalent encoded permutation function further includes: obscuring the index by determining an equivalent encoded expression for the index using split variables and replacing the index in the permutation function with the encoded expression for the index.

Various embodiments are described wherein the split variables are split into two portions.

Various embodiments are described wherein the split variables are determined using first and second secret splitting multiplicative values and a modulus value.

Various embodiments are described wherein the split variables are further determined using a secret splitting additive value.

Various embodiments are described wherein the permutation function includes multiplying the split variable index by a secret permutation multiplication value.

Various embodiments are described wherein the equivalent split variable expression is arranged so that none of the secret permutation multiplication value, first and second splitting secret multiplicative values, and the secret splitting additive value are observable to an attacker.

Various embodiments are described wherein the permutation function includes adding a secret permutation addition value to the product of the encoded index and the secret permutation multiplication value.

Various embodiments are described wherein the permutation function $f(i)$ is: $f(i)=(A_{\pi}I_{\alpha}I_1+A_{\pi}I_{\beta}I_2+A_{\pi}I_{\gamma})\bmod M$ where i is an index into the data array, $A_{\pi}$, $I_{\alpha}$, $I_{\beta}$, and $I_{\gamma}$ are secret values, and M is a modulus value based upon the size of the data array.

Various embodiments are described wherein the method of obscuring software code is carried out by a compiler.

Various embodiments are described further including a non-transitory machine-readable storage medium encoded with instructions for obscuring software code including a data array and a plurality of operations, the non-transitory machine-readable storage medium including: instructions for identifying, by a processor, a data array with an index to be obscured and an operation using the data array; instructions for permutating the identified data array using a permutating function; and instructions for replacing the identified operation using the permutated data array and equivalent encoded permutation function.

Various embodiments are described further wherein instructions for replacing the operation using the permutated data array and equivalent encoded permutation function further includes: instructions for obscuring the index by determining an equivalent encoded expression for the index using split variables and replacing the index in the permutation function with the encoded expression for the index.

Various embodiments are described wherein the split variables are split into two portions.

Various embodiments are described wherein the split variables are determined using first and second secret splitting multiplicative values and a modulus value.

Various embodiments are described wherein the split variables are further determined using a secret splitting additive value.

Various embodiments are described wherein the permutation function includes multiplying the split variable index by a secret permutation multiplication value.

Various embodiments are described wherein the equivalent split variable expression is arranged so that none of the secret permutation multiplication value, first and second splitting secret multiplicative values, and the secret splitting additive value are observable to an attacker.

Various embodiments are described wherein the permutation function includes adding a secret permutation addition value to the product of the encoded index and the secret permutation multiplication value.

Various embodiments are described wherein the permutation function $f(i)$ is: $f(i)=(A_\pi I_\alpha I_1 + A_\pi I_\beta I_2 + A_\pi I_\gamma) \mod M$ where i is an index into the data array, $A_\pi$, $I_\alpha$, $I_\beta$, and $I_\gamma$ are secret values, and M is a modulus value based upon the size of the data array.

Various embodiments are described wherein instructions for obscuring software code including a data array and a plurality of operations are part of a compiler.

Various embodiments are described further including a method of controlling a server that provides an application that implements a white-box implementation of a cryptographic function that includes obscured software code including a data array and a plurality of operations, including: receiving a request from a user for the application that implements a white-box implementation of a cryptographic function that includes obscured software code including a data array and a plurality of operations; and providing the user the application that implements a white-box implementation of a cryptographic function that includes obscured software code including a data array and a plurality of operations, wherein the application was created by: identifying, by a processor, a data array with an index to be obscured and an operation using the data array; permutating the identified data array using a permutating function; and replacing the identified operation using the permutated data array and equivalent encoded permutation function.

Various embodiments are described wherein replacing the operation using the permutated data array and equivalent encoded permutation function further includes: obscuring the index by determining an equivalent encoded expression for the index using split variables and replacing the index in the permutation function with the encoded expression for the index.

Various embodiments are described wherein the permutation function $f(i)$ is: $f(i)=(A_\pi I_\alpha I_1 + A_\pi I_\beta I_2 + A_\pi I_\gamma) \mod M$ where i is an index into the data array, $A_\pi$, $I_\alpha$, $I_\beta$, and $I_\gamma$ are secret values, and M is a modulus value based upon the size of the data array.

Various embodiments are described further including a method of obscuring software code implementing a modular exponentiation function, including: receiving modular exponentiation parameters including an exponent e having N bits; generating a bitwise exponent array and inverse bitwise exponent array; and generating modular exponentiation function operations using the bitwise exponent array, inverse bitwise exponent array, and N, wherein the generated modular exponentiation function operations are split variable operations.

Various embodiments are described wherein generating modular exponentiation function operations further includes: generating an operation $r=r*(e(i)*b+e\_inv(i)) \mod m$, where r is the current value of the modular exponentiation, b is a value raised to the power of the exponent e, e(i) is the ith bit of the exponent e, e_inv(i) is the inverse of the ith bit of the exponent e, and m is a modulo value; and generating an operation $b=b*b \mod m$.

Various embodiments are described wherein the steps of generating the operation $r=(e(i)*b+e\_inv(i)) \mod m$ and generating the operation $b=b*b \mod m$ are repeated N times producing operations for each of the N values of i.

Various embodiments are described wherein the modulus m is used as the modulus in the split variables.

Various embodiments are described wherein the split variables are determined using first and second secret splitting multiplicative values and a modulus value.

Various embodiments are described wherein the split variables are further determined using a secret splitting additive value.

Various embodiments are described wherein the split variable expression is arranged so that none of the splitting secret multiplicative values and the secret splitting additive value are observable to an attacker.

Various embodiments are described wherein the method of obscuring software code is carried out by a compiler.

Various embodiments are described further including a non-transitory machine-readable storage medium encoded with instructions for obscuring software code implementing a modular exponentiation function, the non-transitory machine-readable storage medium including: instructions for receiving modular exponentiation parameters including an exponent e having N bits; instructions for generating a bitwise exponent array and inverse bitwise exponent array; and instructions for generating modular exponentiation function operations using the bitwise exponent array, inverse bitwise exponent array, and N, wherein the generated modular exponentiation function operations are split variable operations.

Various embodiments are described wherein instructions for generating modular exponentiation function operations further includes: instructions for generating an operation $r=r*(e(i)*b+e\_inv(i)) \mod m$, where r is the current value of the modular exponentiation, b is value raised to the power of the exponent e, e(i) is the ith bit of the exponent e, e_inv(i) is the inverse of the ith bit of the exponent e, and m is a modulo value; and instructions for generating an operation $b=b*b \mod m$.

Various embodiments are described wherein the instructions for generating the operation $r=r*(e(i)*b+e\_inv(i)) \mod m$ and the instructions for generating the operation $b=b*b \mod m$ are repeated N times producing operations for each of the N values of i.

Various embodiments are described wherein the modulus m is used as the modulus in the split variables.

Various embodiments are described wherein the split variables are determined using first and second secret splitting multiplicative values and a modulus value.

Various embodiments are described wherein the split variables are further determined using a secret splitting additive value.

Various embodiments are described wherein the split variable expression is arranged so that none of the splitting secret multiplicative values and the secret splitting additive value are observable to an attacker.

Various embodiments are described wherein the instructions for obscuring software code implementing a modular exponentiation function are part of a compiler.

Various embodiments are described further including a method of controlling a server that provides an application that implements a white-box implementation of a cryptographic function that includes obscured software code implementing a modular exponentiation function, including: receiving a request from a user for the application that implements a white-box implementation of a cryptographic function that includes obscured software code implementing a modular exponentiation function; and providing the user the application that implements a white-box implementation of a cryptographic function that includes obscured software code implementing a modular exponentiation function, wherein the application was created by: receiving modular exponentiation parameters including an exponent e having N bits; generating a bitwise exponent array and inverse bitwise exponent array; and generating modular exponentiation function operations using the bitwise exponent array, inverse bitwise exponent array, and N, wherein the generated modular exponentiation function operations are split variable operations.

Various embodiments are described wherein generating modular exponentiation function operations further includes: generating an operation r=r*(e(i)*b+e_inv(i)) mod m, where r is the current value of the modular exponentiation, b is a value raised to the power of the exponent e, e(i) is the ith bit of the exponent e, e_inv(i) is the inverse of the ith bit of the exponent e, and m is a modulo value; and generating an operation b=b*b mod m.

Various embodiments are described wherein the steps of generating the operation r=(e(i)*b+e_inv(i)) mod m and generating the operation b=b*b mod m are repeated N times producing operations for each of the N values of i.

Various embodiments are described wherein the modulus m is used as the modulus in the split variables.

Various embodiments are described further including a method of obscuring software code implementing an elliptic curve cryptography (ECC) point multiplication function, including: receiving ECC parameters including a multiplier d having N bits; transforming multiplier d into an array d(i) with −1, 0, and +1 values while maintaining the same value for d; and generating ECC point multiplication function operations using the transformed multiplier array d(i) and N, wherein the generated ECC point multiplication function operations are split variable operations.

Various embodiments are described wherein generating ECC point multiplication function operations further includes: generating a point addition-subtraction operation based upon d(i), wherein the point addition-subtraction performs a point addition when d(i)=+1 and wherein the point addition-subtraction operation performs a point subtraction when d(i)=−1; and generating a point doubling operation.

Various embodiments are described wherein the steps of generating a point addition-subtraction operation and generating a point doubling operation are repeated N times producing operations for each of the N values of i.

Various embodiments are described wherein the prime of the elliptic curve is used as the modulus in the split variables.

Various embodiments are described wherein the split variables are determined using first and second secret splitting multiplicative values and a modulus value.

Various embodiments are described wherein the split variables are further determined using a secret splitting additive value.

Various embodiments are described wherein the split variable expression is arranged so that none of the splitting secret multiplicative values and the secret splitting additive value are observable to an attacker.

Various embodiments are described wherein the method of obscuring software code is carried out by a compiler.

Various embodiments are described further including a non-transitory machine-readable storage medium encoded with instructions for obscuring software code implementing an elliptic curve cryptography (ECC) point multiplication function, the non-transitory machine-readable storage medium including: instructions for receiving ECC parameters including a multiplier d having N bits; instructions for transforming multiplier d into an array d(i) with −1, 0, and +1 values while maintaining the same value for d; and instructions for generating ECC point multiplication function operations using the transformed multiplier array d(i) and N, wherein the generated ECC point multiplication function operations are split variable operations.

Various embodiments are described wherein instructions for generating ECC point multiplication function operations further includes: instructions for generating a point addition-subtraction operation based upon d(i), wherein the point addition-subtraction performs a point addition when d(i)=+1 and wherein the point addition-subtraction operation performs a point subtraction when d(i)=−1; and instructions for generating a point doubling operation.

Various embodiments are described wherein the instructions for generating a point addition-subtraction operation and instructions for generating a point doubling operation are repeated N times producing operations for each of the N values of i.

Various embodiments are described wherein the prime of the elliptic curve is used as the modulus in the split variables.

Various embodiments are described wherein the split variables are determined using first and second secret splitting multiplicative values and a modulus value.

Various embodiments are described wherein the split variables are further determined using a secret splitting additive value.

Various embodiments are described wherein the split variable expression is arranged so that none of the splitting secret multiplicative values and the secret splitting additive value are observable to an attacker.

Various embodiments are described wherein instructions for obscuring software code implementing an elliptic curve cryptography (ECC) point multiplication function are part of a compiler.

Various embodiments are described further including a method of controlling a server that provides an application that implements a white-box implementation of a cryptographic function that includes obscured software code implementing an elliptic curve cryptography (ECC) point multiplication function, including: receiving a request from a user for the application that implements a white-box implementation of a cryptographic function that includes obscured software code implementing an elliptic curve cryptography (ECC) point multiplication function; and providing the user the application that implements a white-box implementation of a cryptographic function that includes obscured software code implementing an elliptic curve cryptography (ECC) point multiplication function, wherein the application was created by: receiving ECC parameters including a multiplier d having N bits; transforming multiplier d into an array d(i) with −1, 0, and +1 values while maintaining the same value for d; and generating ECC point multiplication function operations using the transformed multiplier array d(i) and N, wherein the generated ECC point multiplication function operations are split variable operations.

Various embodiments are described wherein generating ECC point multiplication function operations further include: generating a point addition-subtraction operation based upon d(i), wherein the point addition-subtraction performs a point addition when d(i)=+1 and wherein the point addition-subtraction operation performs a point subtraction when d(i)=−1; and generating a point doubling operation.

Various embodiments are described wherein the steps of generating a point addition-subtraction operation and generating a point doubling operation are repeated N times producing operations for each of the N values of i.

Various embodiments are described wherein the prime of the elliptic curve is used as the modulus in the split variables.

Various embodiments are described further including a method of obscuring the input and output of a modular exponentiation function, including: receiving modular exponentiation parameters including an exponent e having N bits and a modulus m; generating randomly a pre-multiplier; calculating a post-multiplier based upon the pre-multiplier, exponent e, and modulus m; multiplying an input to the modular exponentiation function by the pre-multiplier; performing the modular exponentiation function; and multiplying the output of the modular exponentiation function by the post-multiplier, wherein multiplying an input to the modular exponentiation function by the pre-multiplier, performing the modular exponentiation function, and multiplying the output of the modular exponentiation function by the post-multiplier are split variable operations.

Various embodiments are described further wherein calculating a post-multiplier further comprises calculating $y = x^{-e}$ mod m, where y is the post-multiplier and x is the pre-multiplier.

Various embodiments are described wherein the modulus m is used as the modulus in the split variables.

Various embodiments are described wherein the split variables are determined using first and second secret splitting multiplicative values and a modulus value.

Various embodiments are described wherein the split variables are further determined using a secret splitting additive value.

Various embodiments are described wherein the split variable expression is arranged so that none of the splitting secret multiplicative values and the secret splitting additive value are observable to an attacker.

Various embodiments are described wherein the method of obscuring software code is carried out by a compiler.

Various embodiments are described further including a method of obscuring the input and output of implementing an elliptic curve cryptography (ECC) point multiplication function, including: receiving ECC parameters including an input point P and a prime of the elliptic curve; generating randomly a pre-multiplier; generating randomly a post-multiplier; mapping the input point P in an affine coordinate into a projective coordinate; multiplying the mapped input P by the pre-multiplier; performing the ECC point multiplication function; multiplying the output of the ECC point multiplication function by the post-multiplier; and mapping the multiplied output of the ECC point multiplication function to the affine coordinate, wherein multiplying the mapped input P by the pre-multiplier, performing the ECC point multiplication function, and multiplying the output of the ECC point multiplication function by the post-multiplier are split variable operations.

Various embodiments are described wherein: the input point P is (Xi, Yi) and the mapped point P in the projective coordinate is (Xi, Yi, 1); and multiplying the input of the ECC point multiplication function by the pre-multiplier further comprises calculating (Xi*a, Yi*a, a) where a is the pre-multiplier.

Various embodiments are described wherein: multiplying the output of the ECC point multiplication function by the post-multiplier further comprises calculating (Xo*b, Yo*b, Zo*b) where b is the post-multiplier and (Xo, Yo, Zo) is the output of the ECC point multiplication; and mapping the multiplied output of the ECC point multiplication function to the affine coordinate further comprises calculating (Xo/Zo, Yo/Zo).

Various embodiments are described wherein the prime of the elliptic curve is used as the modulus in the split variables.

Various embodiments are described wherein the split variables are determined using first and second secret splitting multiplicative values and a modulus value.

Various embodiments are described wherein the split variables are further determined using a secret splitting additive value.

Various embodiments are described wherein the split variable expression is arranged so that none of the splitting secret multiplicative values and the secret splitting additive value are observable to an attacker.

Various embodiments are described wherein the method of obscuring software code is carried out by a compiler.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
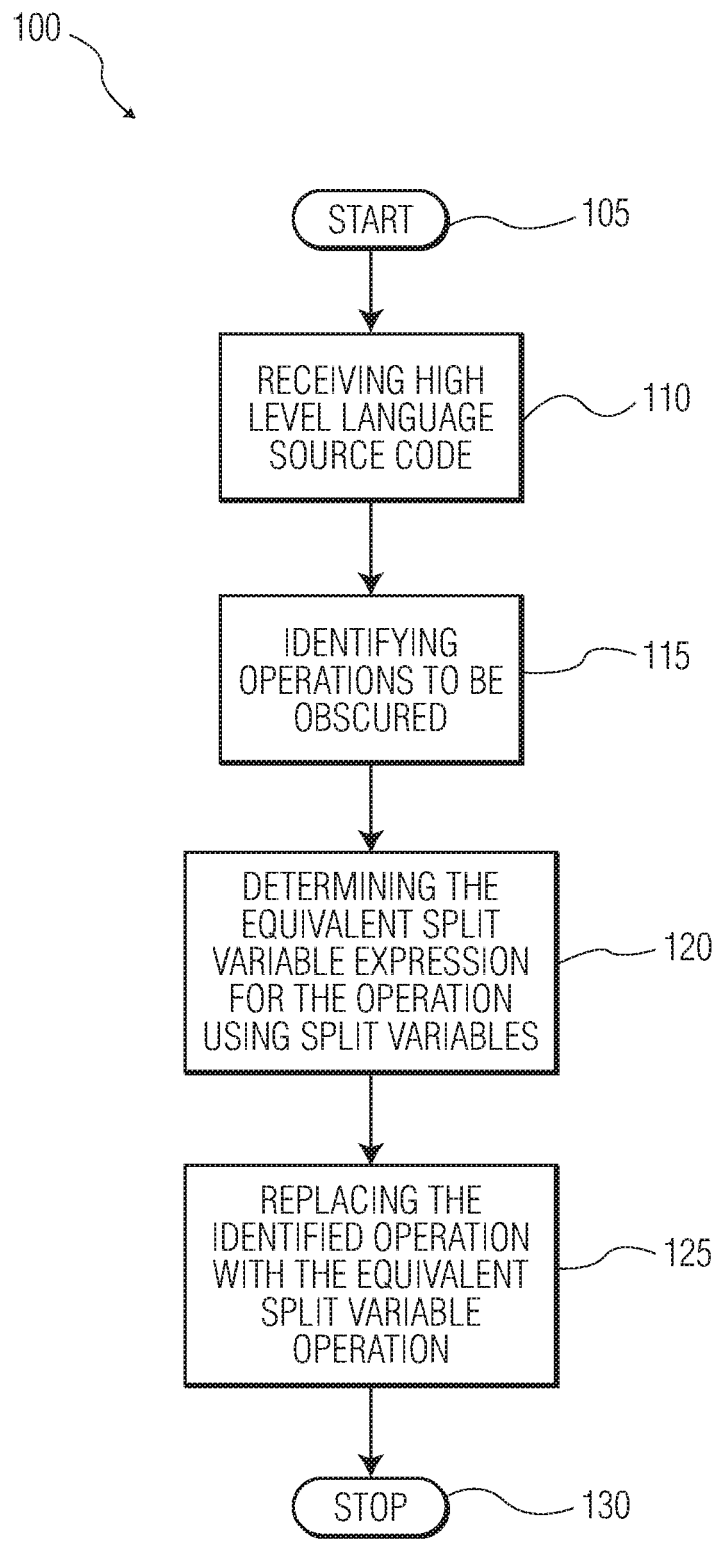
FIG. 1 illustrates a method of obscuring software code using split variable expressions.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In many situations software applications have to be protected against attackers that attempt to reverse engineer the code, such as in the examples mentioned above. Attackers may use sophisticated tools to analyze software in binary form to understand what the software is doing and how the software works.

In many software applications, one wants to hide the values being processed from an attacker by encoding the values so that it is very difficult for the attacker to recover the plain values from the encoded values. The challenge is to perform computations on these encoded values without first decoding them to the plain values, performing the computation, and then encoding the result. In this situation the plain values would become visible to the attacker.

U.S. Pat. No. 7,966,499 to Kandanchatha provides a solution to this problem using modular arithmetic. This technique has the property that there is a bijection between plain and encoded values meaning that every plain value maps to one encoded value. This presents a problem in that it makes attacking such encoding possible.

Below embodiments are described such that there is no longer a bijection meaning that a plain value may have multiple encoded representations. This will make it much more difficult for an attacker to understand the program execution. Of course, every encoded value still maps to one plain value, otherwise the interpretation of the data would no longer be unambiguous.

Kandanchatha describes how to encode integer data and how to do arithmetic on it. Every variable and every intermediate value of a computation has two associated secret values referred to as $\alpha$ and $\beta$. These values may be randomly chosen by a protection tool that implements the data protection and may be seen as secret keys. A plain value x is mapped to encoded value X by $X = X_\alpha x + X_\beta$. An addition $z = x + y$ may be implemented as follows:

$$Z = Z_\alpha \left( \frac{X - X_\beta}{X_\alpha} + \frac{Y - Y_\beta}{Y_\alpha} \right) + Z_\beta.$$

In this expression one sees that x and y are decoded, the addition takes place, and then that the result is encoded again. Doing the computation like this is of course not secure. It becomes secure when the computation is restructured as follows:

$$Z = Z_\alpha X_\alpha^{-1} X + Z_\alpha Y_\alpha^{-1} Y + (-Z_\alpha X_\alpha^{-1} X_\beta + Z_\alpha Y_\alpha^{-1} Y_\beta + Z_\beta)$$

This expression now will be compiled such that constants in front of X and Y and the term inside brackets is evaluated at compile time into single constants. As a result the secret $\alpha$ and $\beta$ values are never be visible in the binary application code that becomes available to the attacker.

In order to ensure that the inverse of $X_\alpha$ and $Y_\alpha$ exist, Kandanchatha uses modular arithmetic in $\mathbb{Z}_m$, where the m and $\alpha$ values are coprime. An efficient implementation on an N-bit processor is to use a modulus of $2^N$ so that the modulus computation is implicitly executed by overflowing arithmetic where arithmetic wraps around. In this case, the addition on the encoded data may be performed with two multiplies and two additions.

Due to modular arithmetic, if large random values for the $\alpha$ and $\beta$ values are used, the encoded value will be quite different from the plain value and will behave quite differently. Other operations, such as subtraction and multiplication, can be done in a similar fashion as illustrated in Kandanchatha.

In the embodiments described below, a value x is not mapped to a single value X (as in Kandanchatha) but instead to two values $X_1$ and $X_2$ such that x may be represented by multiple combinations of $X_1$ and $X_2$. The property that a single plain value has multiple representations will increase the difficulty in understanding the execution of the program by an attacker.

The following relation between a plain value x and its encoded representation $X_1$ and $X_2$ is used:

$$x = X_\alpha X_1 + X_\beta X_1 + X_\gamma$$

where $X_\alpha$, $X_\beta$, and $X_\gamma$ are secret values. For an addition $z = x + y$, the following encoding would be applied:

$$Z_\alpha Z_1 + Z_\beta Z_2 + Z_\gamma = X_\alpha X_1 + X_\beta X_2 + X_\gamma + Y_\alpha Y_1 + Y_\beta Y_2 + Y_\gamma$$

This equality may be split into two equalities as follows (other ways to split are possible as well):

$$Z_\alpha Z_1 + Z_\gamma = X_\alpha X_1 + Y_\beta Y_2 + Y_\gamma$$

$$Z_\beta Z_2 = Y_\alpha Y_1 + X_\beta X_2 + X_\gamma$$

Isolating for $Z_1$ and $Z_2$ gives:

$$Z_1 = Z_\alpha^{-1}(X_\alpha X_1 + Y_\beta Y_2 + Y_\gamma - Z_\gamma)$$

$$Z_2 = Z_\beta^{-1}(Y_\alpha Y_1 + X_\beta X_2 + X_\gamma)$$

Or:

$$Z_1 = Z_\alpha^{-1} X_\alpha X_1 + Z_\alpha^{-1} Y_\beta Y_2 + Z_\alpha^{-1} Y_\gamma - Z_\alpha^{-1} Z_\gamma$$

$$Z_2 = Z_\beta^{-1} Y_\alpha Y_1 + Z_\beta^{-1} X_\beta X_2 + Z_\beta^{-1} X_\gamma$$

Again, the code may be compiled so that the individual $\alpha$, $\beta$, and $\gamma$ values are not present in the resulting code. Furthermore, modular arithmetic is needed and the modulus needs to be co-prime with $\alpha$, $\beta$, and $\gamma$ values.

The split values $Z_1$ and $Z_2$ may then be input to other operations based upon these values. Some or all of the various mathematical operations in a program may be carried out using the split variables. Once the actual values are need to be passed to another system, the values may be decoded.

In a similar manner a multiplication operation $Z = X \cdot Y$ may be computed as follows:

$$Z_\alpha Z_1 + Z_\beta Z_2 + Z_\gamma = (X_\alpha X_1 + X_\beta X_2 + X_\gamma)(Y_\alpha Y_1 + Y_\beta Y_2 + Y_\gamma).$$

After splitting (other splits are possible as well) and isolating for $Z_1$ and $Z_2$ gives:

$$Z_1 = (Z_\alpha^{-1} X_\alpha Y_\alpha Y_1 + Z_\alpha^{-1} X_\alpha Y_\beta Y_2 + Z_\alpha^{-1} X_\alpha Y_\gamma) X_1 + Z_\alpha^{-1} X_\gamma Y_\alpha + Z_\alpha^{-1} Z_\gamma$$

$$Z_2 = (Z_\beta^{-1} X_\beta Y_\alpha Y_1 + Z_\beta^{-1} X_\beta Y_\beta Y_2 + Z_\beta^{-1} X_\beta Y_\gamma) X_2 + Z_\beta^{-1} X_\gamma Y_\alpha Y_1 + Z_\beta^{-1} X_\gamma Y_\beta Y_2$$

Again, the code may be compiled so that the individual $\alpha$, $\beta$, and $\gamma$ values are not present in the resulting code.

It is noted that the variables may be split into more than two portions, for example, x may be split into N portions $X_1$, $X_2$, ..., $X_N$. The encoding of x may use N+1 secret values to encode the N portions $X_1$, $X_2$, ..., $X_N$ similar to what is described above. Further, the various calculations described above, as well as others, may be expanded to use N split portions as well.

Other operations may be implemented similarly. The cost for the increased difficulty for the attacker is doubling the size of the encoded representation and roughly doubling the increase in computational effort. In return, the property that a single plain value has multiple representations will increase the difficulty of an attacker trying to understand the execution of the program.

It is noted that the encoding using split variables may use various different combinations of the products to generate the split representations of the variables. In some embodiments, different combinations may be used for different instances of a calculations, such as for example a multiplication. The specific combinations used to encode the data for a calculation may be chosen independently for each instance of the calculation. This may be done randomly or in some known order. For example, N different groupings may be identified to encode the data for a calculation. Then one of the N different groupings may be used with each instance of the calculation.

The embodiments described herein may be implemented in a complier that compiles a higher order language into machine code for execution on a processor. Also, the embodiments may be applied to existing machine code to obscure the operation of that machine code.

FIG. 1 illustrates a method of obscuring software code using split variable expressions. The method 100 may begin at 105. Next, the method may receive high level language source code 110. Then the method 100 may identify the operations in the high level code to be obscured 115. Next, the method 100 may determine the equivalent split variable expression for the operation using split variables 120. Then the method 100 may replace the identified operation with the equivalent split variable operation 125. The method 100 then ends at 130.

Figure 2:
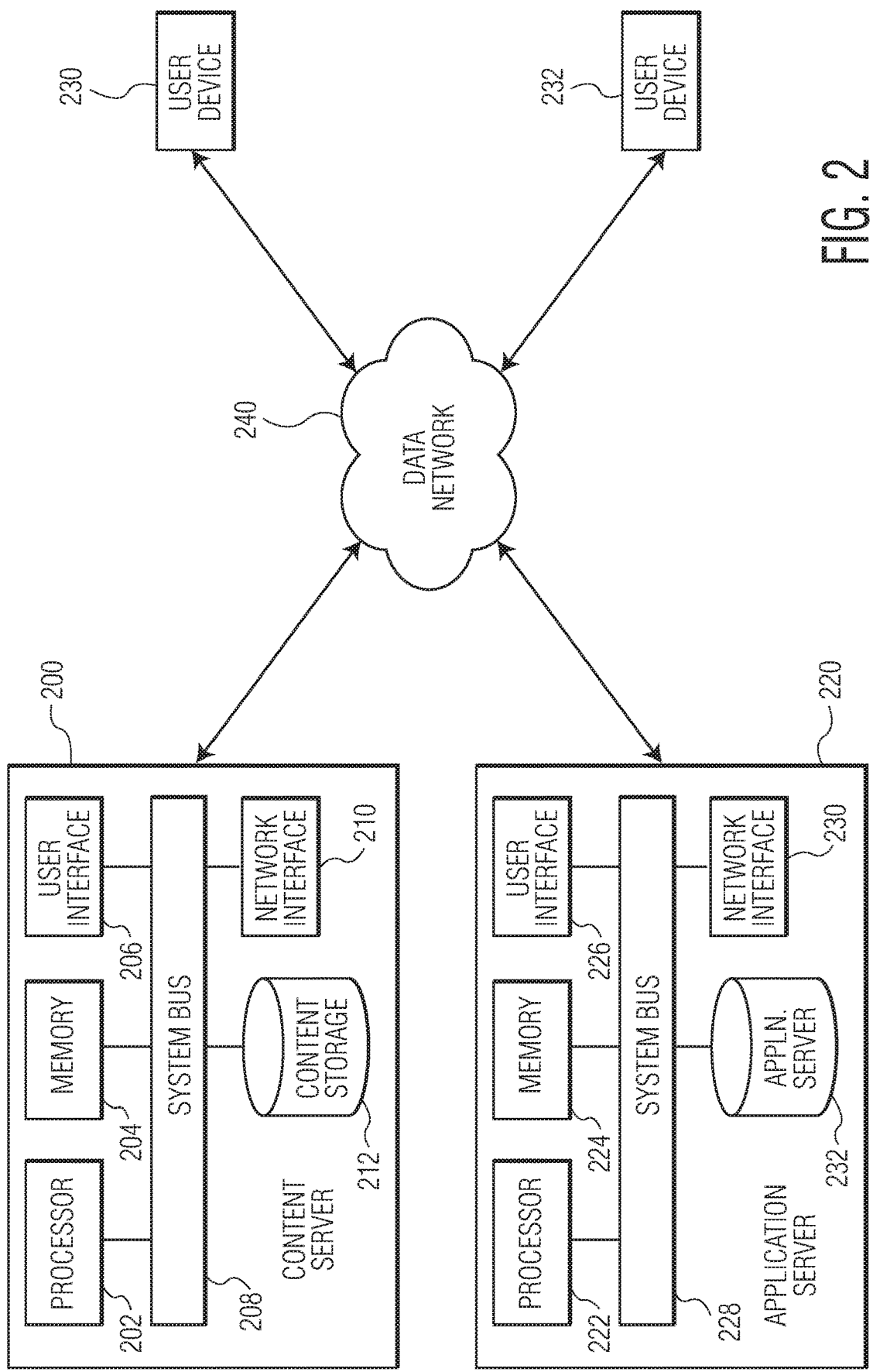
FIG. 2 illustrates a system for providing a user device secure content and a software application that processes the secure content.

FIG. 2 illustrates a system for providing a user device secure content and a software application that processes the secure content. For example, the software application may be obscured as described above. The system includes a content server 200, application server 220, user devices 250, 252, and a data network 240. The user devices 250, 252 may request access to secure content provided by the content server 200 via data network 240. The data network can be any data network providing connectivity between the user devices 250, 252 and the content server 200 and application server 220. The user devices 250, 252 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 200. The software application may be downloaded from the application server 220. The software application may be obscured using the techniques described above as well as operate as described above. Once the user devices 250, 252 install the software application, the user device may then download secure content from the content server 200 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 200 may control the access to the secure content provided to the user devices 250, 252. As a result when the content server 200 receives a request for secure content, the content server 200 may transmit the secure content to the requesting user device. Likewise, the application server 220 may control access to the software application provided to the user devices 250, 252. As a result when the content server 220 receives a request for the software application, the application server 220 may transmit the software application to the requesting user device. A user device requesting the software application or secure content may also be authenticated by the respective servers, before providing the software application or secure content to the user device.

The content server 200 may include a processor 202, memory 204, user interface 206, network interface 210, and content storage 212 interconnected via one or more system buses 208. It will be understood that FIG. 2 constitutes, in some respects, an abstraction and that the actual organization of the components of the device 200 may be more complex than illustrated.

The processor 202 may be any hardware device capable of executing instructions stored in memory 204 or storage 212. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 202 may include static random access memory (SRAM), dynamic RAM (DRAM), flash memory, read only memory (ROM), or other similar memory devices.

The user interface 206 may include one or more devices for enabling communication with a user such as an administrator. For example, the user interface 206 may include a display, a mouse, and a keyboard for receiving user commands.

The network interface 210 may include one or more devices for enabling communication with other hardware devices. For example, the network interface 210 may include a network interface card (NIC) configured to communicate according to the Ethernet protocol. Additionally, the network interface 210 may implement a TCP/IP stack for communication according to the TCP/IP protocols. Various alternative or additional hardware or configurations for the network interface 210 will be apparent.

The content storage 212 may include one or more machine-readable content storage media such as read-only memory (ROM), random-access memory (RAM), magnetic disk storage media, optical storage media, flash-memory devices, or similar storage media. In various embodiments, the content storage 212 may store content to be provided to users.

The application server 220 includes elements like those in the content server 200 and the description of the like elements in the content server 200 apply to the application server 220. Also, the content storage 212 is replaced by application storage 232. Further, it is noted that the content server and applications server may be implemented on a single server. Also, such servers may be implemented on distributed computer systems as well as on cloud computer systems.

The embodiments for encoding data to hide the value of the data used in calculations described above may be used in various applications which will be described below.

One application of encoding data involves the use of data arrays. If an encoded value is used to index the data array, the data must be stored to accommodate the fact that the index is encoded. An embodiment will be described where a secret permutation of the array elements is realized as well as performing the address computation necessary to access the requested element in such a way that the secret values associated with the encoded index are not revealed.

If an encoded value is used as an index to access an element in a data array, then the encoded value has to be decoded in order to calculate the address of the element. This is because, during execution, the processor needs plain addresses to access memory. The decoded address will reveal the index. Furthermore, when decoding the encoded index, the secret $\alpha$, $\beta$, and $\gamma$ values used to encode the index become explicit in the code, and these explicit values then may be used to derive other $\alpha$, $\beta$, and $\gamma$ values used in other calculations. Accordingly, an attacker may be able to work backwards to break the encoding on various calculations in the code.

These problems may be addressed by using a value $f(i)$ instead of using an index i to access an array A having M elements, where $f(i)$ is defined as:

$$f(i)=(A_\pi \times i) \bmod M$$

In the embodiments described herein, the (C/C++) convention for array indices will be used, where array indices are in the range of 0 to M−1, but other conventions may be used. Accordingly, a secret value $A_\pi$ is selected such that $f$ is bijective on [0;M]. Unless M is very large, it does not take long to find a proper value for $A_\pi$, that is, a value that results in $f$ being bijective on [0;M]. As described above, the encoding is computed using modular computation in $\mathbb{Z}_m$. The multiplication by (a large) $A_\pi$ causes a permutation of the indices, that is the array A is scrambled or rearranged based upon a permutation function $f(i)$. As a result each entry of the array A is moved to a new location based upon the permutation function $f(i)$. Furthermore, if the index i is encoded as $I_\alpha I_1+I_\beta I_2+I_\gamma$, then the array index computation using the permutation function becomes:

$$f(i)=(A_\pi I_\alpha I_1+A_\pi I_\beta I_2+A_\pi I_\gamma) \bmod M$$

As can be seen, the secret values are merged into products so that they are not explicitly visible in the code when the code is compiled and the products evaluated. So, with this embodiment two goals are achieved: (1) a secret permutation of the data in the array is realized; and (2) the address of an element is able to be computed without disclosing the secret values associated with the index.

The embodiment of encoding data array indexes may also be applied to multi-dimensional arrays as well. In this case the same permutation function $f$ may be applied to each index value. In another embodiment, different permutation functions $f$ with different $A_\pi$, $I_\alpha$, $I_\beta$, $I_\gamma$ values may be used to further obscure the different index values.

The embodiment of coding data array indexes described above maps the index values of zero to zero. This may be avoided by introducing another secret value $A_\delta$ into the permutation function as follows:

$$f(i)=(A_\pi \times i+A_\delta) \bmod M; \text{ and}$$

$$f(i)=(A_\pi I_\alpha I_1+A_\pi I_\beta I_2+A_\pi I_\gamma+A_\delta) \bmod M$$

In this case when the index i equals zero, $f(0)=A_\delta$. This overcomes the fixed mapping of zero to zero.

The embodiment of coding data array indexes described herein may be used in combination with the various other encoding embodiments described herein as well as with the embodiments described in U.S. Pat. No. 7,966,499 to Kandanchatha.

In another embodiment only M' elements may be mapped in the space of M elements, where M'<M. This makes it easier to find a suitable value $A_\pi$ for large arrays M.

Figure 3:
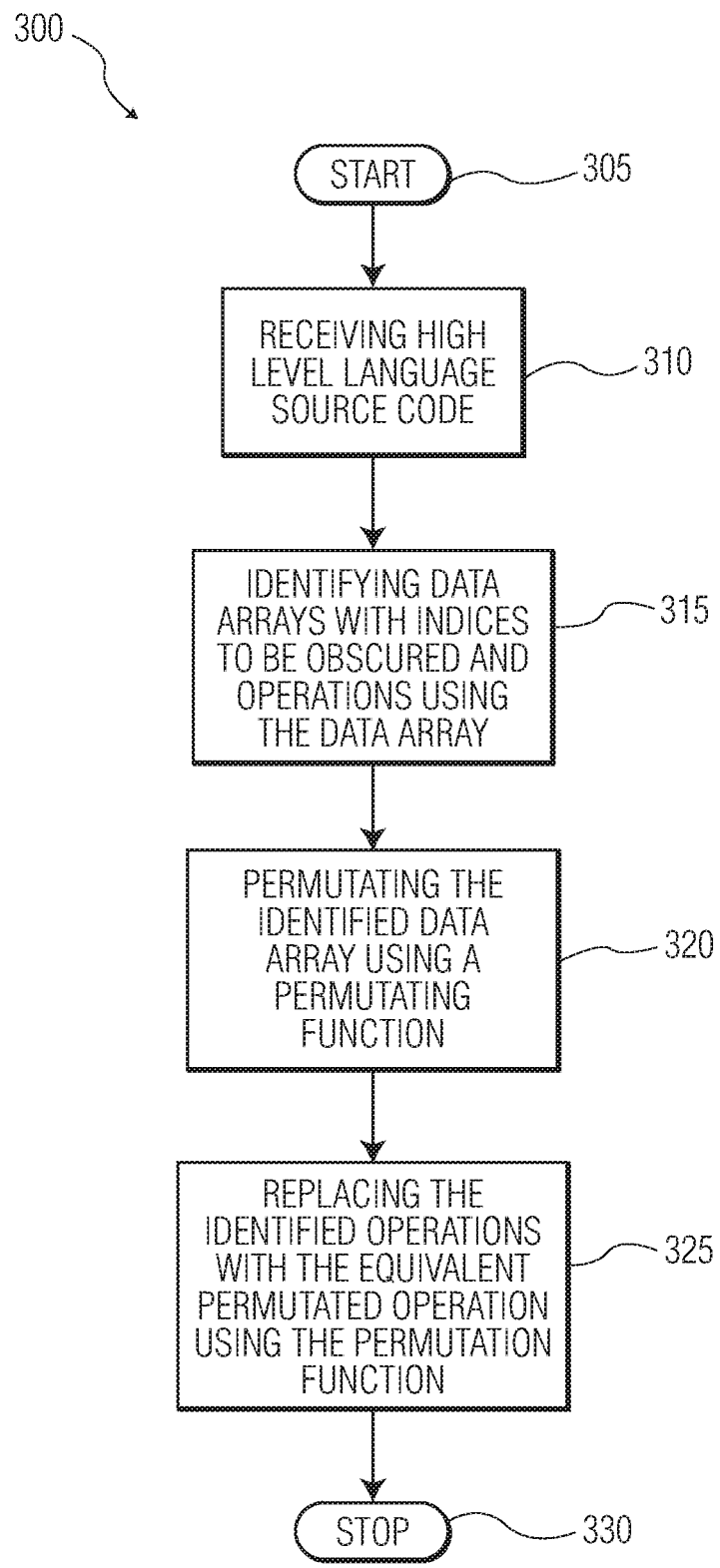
FIG. 3 illustrates a method of obscuring software code with data arrays using split variable encoding and an array index permutation function.

FIG. 3 illustrates a method of obscuring software code with data arrays using split variable encoding and an array index permutation function. The method 300 may begin at 305. Next, the method may receive high level language source code 310. Then the method 300 may identify data arrays with indices to be obscured and operations using the data arrays 315. Next, the method 300 may permutate the identified data array using a permutating function 320. This may done as described above where values for $A_\pi$, $A_\delta$, $I_\alpha$, $I_\beta$, $I_\gamma$ are randomly selected and then the function $f(i)$ is used to reorder/permutate the array A. Then the method 300 may replace the identified operations with the equivalent permutated operation using the permutation function 325. In such a case, an array access such as A(i) may be replaced by $A(f(i))$ where $f(i)=(A_\pi I_\alpha I_1+A_\pi I_\beta I_2+A_\pi I_\gamma) \bmod M$. The method 300 then ends at 330.

Another embodiment of the application of split variable encoding will now be described. RSA describes a cryptographic operation that may implement a public key cryptographic system. RSA uses modular exponentiation to encrypt/decrypted messages. Modular exponentiation is the computation $b^e \bmod m$ on integer data where b is called the base, e is called the exponent, and $\pi$ is called the modulus.

When RSA is executed on an open platform, such as a PC or a mobile phone, one has to protect the exponent e because it corresponds to the private key of RSA. This protection results in a white-box implementation of the function.

The encoding of data using split variables described above may be used to construct a white-box implementation of modular exponentiation. A common way to implement N bit modular exponentiation is the following function:

```
modular_exponentiation(b, e, m)
begin
    r = 1
    for i = 1 to N do
    begin
        if e(i) then
            r = r * b mod m
        b = b * b mod m
    end
    return r
end
```

In this function e(i) corresponds to an array of bits holding the bits of e where the first entry holds the least significant bit of e and the last entry holds the most significant bit of e.

Three steps may be performed to realize a white-box implementation of modular exponentiation. The first step is to replace the conditional statement by an unconditional equivalent. The following function is one example of how this may be done:

```
modular_exponentiation(b, e, e_inv, m)
begin
    r = 1
    for i = 1 to N do
    begin
        r = r * (e(i) * b + e_inv(i)) mod m
        b = b * b mod m
    end
    return r
end
```

In this function, the array e_inv contains the bit-wise inverses of the array e. As a result the conditional statement in the first function is replaced by a single statement that will be executed each pass through the loop. This reduces an attacker's ability to glean information about the function while operating, because the execution of the conditional steps in the loop directly reveals the value of the exponent bits that are to be kept secret. Notice that the N bit exponent is now encoded using 2N encoded values of two integers each ($X_1$ and $X_2$).

The next step to obscure the operation of the modular exponentiation function is to unroll the loop. This is illustrated in the following function:

```
modular_exponentiation(b, e, e_inv, m)
begin
    r = 1
    r = r * (e(1) * b + e_inv(1)) mod m
    b = b * b mod m
    r = r * (e(2) * b + e_inv(2)) mod m
    b = b * b mod m
    ...
    r = r * (e(N) * b + e_inv(N)) mod m
    b = b * b mod m
    return r
end
```

By unrolling the loop, different encodings will be used for the calculations for each iteration of the loop. This makes it more difficult for an attacker to determine the specific operation of the loop. If a developer of the modular exponentiation wants to reduce memory usage, the developer may decide not to unroll the loop. This is a security versus memory requirements trade-off that the developer can weigh at the time the modular exponentiation is implemented.

What remains is a function of multiply, addition, and modulo operations. Multiplies and additions may be handled by the encoding scheme using split variable, but the modulo operations cannot be handled by the encoding scheme. The final step to realize a white-box implementation of modular exponentiation involves encoding the data in the function using split variable encoding where the modulus used in the split variable encoding is the modulus of the modular exponentiation function. As a result, the modulo operations of the modular exponentiation function are no longer necessary. They happen automatically as a result of the encoding applied on the data on which the modular exponentiation function operates.

The function then becomes:

```
modular_exponentiation(b, e, e_inv, m)
begin
    r = 1
    r = r * (e(1) * b + e_inv(1))
    b = b * b
    r = r * (e(2) * b + e_inv(2))
    b = b * b
    ...
    r = r * (e(N) * b + e_inv(N))
    b = b * b
    return r
end
```

This function is then modified by encoding the data using split variable as described above, where the modulus used in the encoding is the same as the modulus used in the modular exponentiation function.

In summary, the modular exponentiation function may be modified as follows: (1) replacing the conditional statement that is based upon the exponent value; (2) unrolling the loop based upon the number of bits in the exponent value; and (3) using the modulus of the modular exponentiation function as the modulus for the encoding.

A software tool may be implemented that generates code that implements the modular exponentiation function described above for a given exponent that is hidden in the implementation. The tool generates an internal representation of the computation and then transforms the representation into an semantically equivalent one where all the secret values are combined into products. After that the tool may generate high level code, for example C code, for this internal representation. The secret values may be selected to have the same length as the modulus of the modular exponentiation (N), for example 1024 and 2048 bits.

Using encoded values as described in the embodiments above is important for the implementation of the modular exponentiation function. Because a single value may result in many different representations when encoded, the values for the e(i) and e_inv(i) arrays are protected. Otherwise, because e(i) and e_inv(i) contain only two possible values, it may be easy to guess the secret exponent value. Encoding these values make it more difficult to guess the underlying values.

Figure 4:
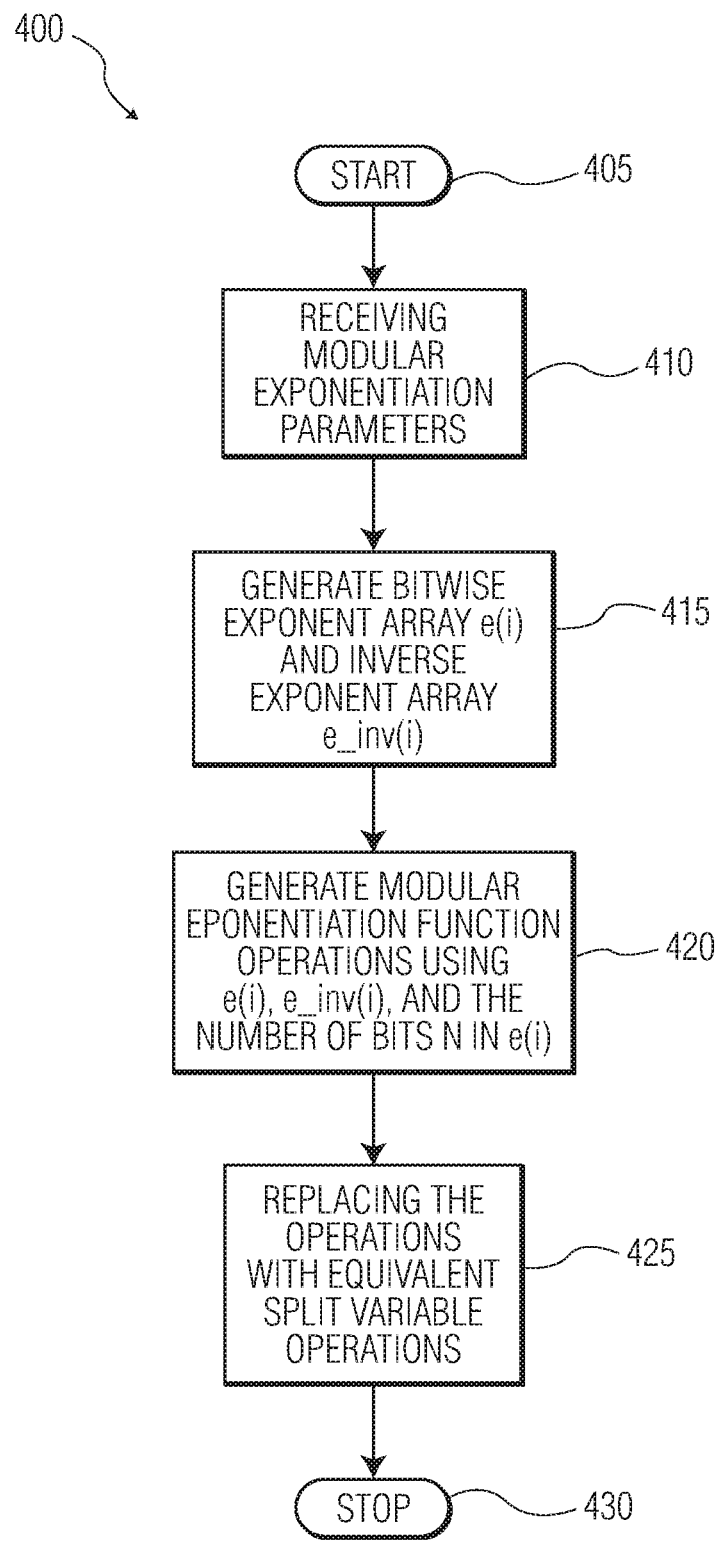
FIG. 4 illustrates a method of obscuring a modular exponentiation function.

FIG. 4 illustrates a method of obscuring a modular exponentiation function. The method 400 may begin at 405. Next, the method may receive modular exponentiation parameters 410. The modular exponentiation parameters may include the secret exponent e and the modulo value m. Then the method 400 may generate bitwise exponent array e(i) and inverse exponent array e_inv(i) 415 corresponding to the secret exponent e. Next, the method 400 may generate modular exponentiation function operations, as shown above, using e(i), e_inv(i), and the number of bits N in e(i) 420. This will be done by using e(i) and e_inv(i) instead of a conditional statement, and also by unrolling the loop that is typically used to perform the modular exponentiation function. Unrolling the loop includes repeating the operations used to perform the modular exponentiation function N times for each of the N bits of the exponent e. Then the method 400 may replace the operations in the generated modular exponentiation function with equivalent split variable operations 425. Further, the modulo function of the modular exponentiation function may be carried out by the modulo function used to carry out operations on the encoded values. The method 400 then ends at 430.

The method for calculating the modular exponentiation function described above uses the so-called right-to-left method. Other examples of methods for calculating modular exponentiation function include the left-to-right method and Montgomery Ladder method. The methods for obscuring the modular exponentiation function described above also may apply to these other methods of computing the modular exponentiation function.

Now another embodiment of the application of split variable encoding will now be described. Elliptic curve cryptography (ECC) is an approach to public-key cryptography based on the algebraic structure of elliptic curves over finite fields. One of the main benefits in comparison with non-ECC cryptography is the same level of security provided by keys of smaller size as compared to RSA cryptography.

Split variable encoding may be applied to ECC for curves that belong to the class of prime curves. The core operation in ECC is point multiplication where a point P on the elliptic curve in the XY plane is multiplied with a scalar value. The point P may be described by the coordinates (X, Y). In this case the scalar value, called d, has to be kept secret and acts as a secret key. This point multiplication is performed by a loop that is very similar to the loop for modular exponentiation that was described above. It is noted that point multiplication is also known as scalar multiplication. However, instead of squaring, an operation called point doubling is performed, and instead of multiplication, an operation called point addition is performed. A common way to implement N bit ECC point multiplication is the following function:

```
point_multiplication(d, P)
begin
    Q = 0
    for i = 1 to N do
    begin
        if d(i) then
            Q = point_addition(Q, P)
        P = point_doubling(P)
    end
    return Q
end
```

The function above multiplies point P on an elliptic curve by scalar d and computes the result in Q. The computation of point addition and point doubling involves several multiplications, additions, subtractions and inversions. The inversions may be eliminated by using another coordinate system. Several coordinate systems are available that map a (X, Y) coordinate of the point P to a (X, Y, Z) coordinate. After switching to a suitable coordinate system, the conditional may be removed and the loop unrolled as was done for modular exponentiation. In this case, the prime of the elliptic curve is used as the modulus for the split variable encoding.

This modification of the elliptic curve point multiplication function is similar to the modification applied to the modular exponentiation as describe above. However, for elliptic curve point multiplication function further modifications may be made.

The fact may be exploited that for elliptic curve point multiplication there is an opposite function of point addition called point subtraction. The following relation holds:

point_subtraction(point_addition($Q,P$),$P$)=$Q$.

So if a point P is added to point Q and after that P is subtracted, then the value Q is arrived at again. With this operation the function above may be rewritten into the following one:

```
point_multiplication(d, P)
begin
    Q = 0
    for i = 1 to N do
    begin
        if d(i) == +1 then
            Q = point_addition(Q, P)
        else if d(i) == -1 then
            Q = point_subtraction(Q, P)
        P = point_doubling(P)
    end
    return Q
end
```

While before this transformation the bits in the secret key d had unsigned values 0 and 1, after the transformation d has signed values −1, 0, and +1, where point subtraction happens when a bit is −1 and point addition happens when a bit is +1.

With this version of the function, d may be transformed to a version where the number of zeroes is minimized. The motivation for minimizing the zeroes is that with the proposed split variable encoding it is easier to hide values of −1 and +1 in a string of signed bits than hiding values of 0 and 1 in a string of unsigned bits. For the latter, point addition for the zero bits is suppressed using the technique described above. Using values of +1 and −1 for the secret key d, the implementation of the point multiplication function should prevent an attacker from distinguishing point addition from point substitution. These two operations differ from each other in that point subtraction includes a negation of the Y value followed by point addition. As a result, when encoding the integer representation of '−1', the negation may be absorbed into the secret, α, β, and γ values. If the attacker is not able to factorize the constants in the final code implementing the point addition/subtraction, then the attacker may not observe the negation. The trailing zeroes that remain in d may be skipped in the loop. The attacker may detect this, but because the number of zeroes is small in typical cases (one zero bit on average), the leakage is small and the effective key length becomes only slightly shorter.

Minimizing the zeroes can be done by sweeping from right (least significant bit) to left (most significant) through the bits of secret key d and replacing adjacent bits 0 and 1 by +1 and −1. For example, for the original d in the usual binary representation:

$d$=1 0 1 0 0 1 1 0

This represents decimal value 166 (=128+32+4+2). Applying the sweep gives:

$d$=+1 +1 −1 +1 −1 −1 +1 0

This results in the same decimal value 166 (=128+64−32+16−8−4+2). The only zeroes that remain are the left most ones. In this case, one zero remains.

Using the transformed value of d and unrolling the loop, the point multiplication function becomes:

```
point_multiplication(d, P)
begin
    Q = 0
    Q = point_addition-subtraction(Q, P, (d(1))
    P = point_doubling(P)
    Q = point_addition-subtraction(Q, P, (d(2))
    P = point_doubling(P)
    . . .
    Q = point_addition-subtraction(Q, P, (d(N))
    P = point_doubling(P)
    return Q
end
```

The point_addition and point_subtraction functions are replaced by the point_addition-subtraction function that takes d(i) as an input and where the value of d(i) is included in the split variable encoding as described above. This allows for the implementation of both the point_addition and point_substraction functions based upon the value of d(i). This leads to the execution time of the point multiplication function being independent of the value of d.

In another embodiment, d may be transformed to signed bits in the so called non-adjacent form (NAF) where the number of zeroes is maximized. This reduces the number of point additions and subtractions and therefore reduces the execution time.

As described above for the modular exponentiation function, a software tool may be implemented that generates code that implements the ECC point multiplication function described above for a given multiplier d that is hidden in the implementation. The tool generates an internal representation of the computation and then transforms the representation into an semantically equivalent one where all the secret values are combined into products. After that the tool may generate high level code, for example C code, for this internal representation.

The method for calculating the point multiplication function described above uses the so-called right-to-left method. Other examples of methods for calculating point multiplication function include the left-to-right method and Montgomery Ladder method. The methods for obscuring the point multiplication function described above also may apply to these other methods of computing the point multiplication function.

Figure 5:
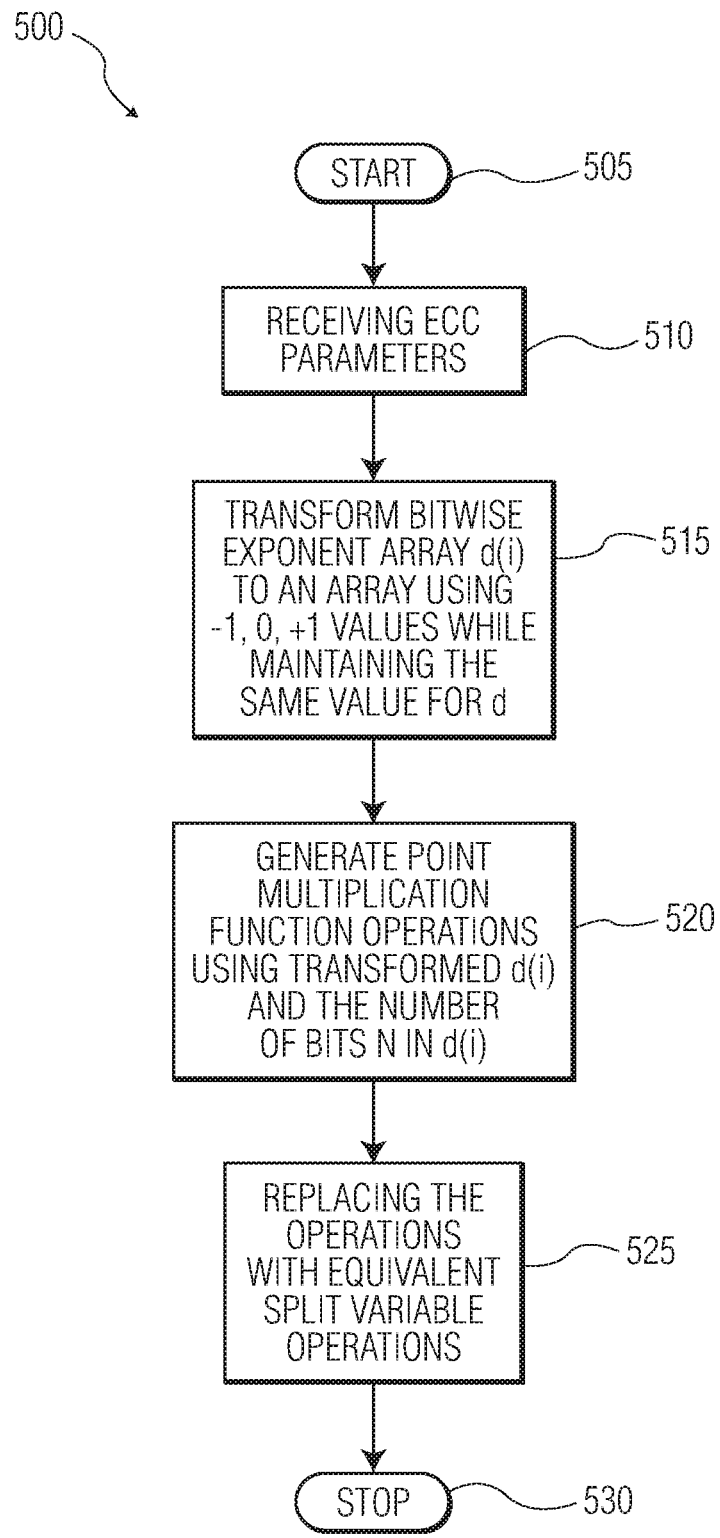
FIG. 5 illustrates a method of obscuring an ECC point multiplication function.

FIG. 5 illustrates a method of obscuring an ECC point multiplication function. The method 500 may begin at 505. Next, the method may receive ECC parameters 510. The ECC parameters may include the secret multiplier d and the prime of the elliptic curve. Then the method 500 may transform bitwise exponent array d(i) to an array using −1, 0, +1 values while maintaining the same value for d 515. This may be done using the sweep method described above where adjacent 0 and 1 values are replaced by +1 and −1 values. Next, the method 500 may generate point multiplication function operations using transformed d(i) and the number of bits N in d(i) 520. This will be done by including the value of d(i) into the point addition/subtraction operation instead of a conditional statement, and also by unrolling the loop that is typically used to perform the point multiplication function. Unrolling the loop includes repeating the operations used to perform the point multiplication function N times for each of the N bits of the multiplier d. Then the method 500 may replace the operations in the generated point multiplication function with equivalent split variable operations 525. The prime of the elliptic curve is used as modulus for the split variable encoding. The method 500 then ends at 530.

Now another embodiment of the application of split variable encoding will now be described. In the white-box implementations of RSA and ECC as described above, the input value(s) are encoded to a split variable encoded value at the input and the output value(s) are decoded to a plain value at the output. This is potential point of attack as encoding and decoding will result in the secret $\alpha$, $\beta$, and $\gamma$ values of the encoded input and output values being explicit in the code. With these values the attacker can continue to discover more secret values that are multiplied with the discovered secret values. By doing this the attacker may step by step discover all secret values in the white-box implementation.

Below embodiments are described that provide solutions to this problem for both modular exponentiation and elliptic curve point multiplication.

First an embodiment for modular exponentiation is described. The function for the modular exponentiation computation may be rewritten by adding a pre-multiplication with a pre-multiplier x at the input and by adding a post-multiplication with a post-multiplier y at the output where $y = x^{-e}$ mod m. The x value is a randomly chosen constant (which needs to be co-prime with m in order to be invertible), and the y value follows from x. The x and y values are split variable encoded. The function (prior to unrolling and removing the conditional execution) then becomes:

```
modular_exponentiation(b', e, m)
  begin
    b = b' * x                  // pre-multiplication
    r = 1
    for i = 1 to N do
      begin
        if e(i) then
          r = r * b mod m
        b = b * b mod m
      end
    r' = r * y                  // post-multiplication
    return r'
  end
```

In this function the plain input and output values are marked with a prime (b' and r'). The motivation for starting and ending the function with a multiplication lies in the split variable encoding scheme. If two encoded operands are multiplied to produce an encoded result, this results in constants in the function that have three secret values in them: two from each of the operands and one from the result. This is shown below for multiplying $x = X_\alpha X_1 + X_\beta X_2$ times $y = Y_\alpha Y_1 + Y_\beta Y_2$ giving $z = Z_\alpha Z_1 + Z_\beta Z_2$ (for simplicity the y values are set to zero):

$$Z_1 = X_\alpha Y_\alpha Z_\alpha^{-1} X_1 Y_1 + X_\beta Y_\beta Z_\alpha^{-1} X_2 Y_2$$

$$Z_2 = X_\alpha Y_\beta Z_\beta^{-1} X_1 Y_2 + X_\beta Y_\alpha Z_\beta^{-1} X_2 Y_1$$

If the product of an encoded value $x = X_\alpha X_1 + X_\beta X_2$ and the plain value y resulting in encoded value $z = Z_\alpha Z_1 + Z_\beta Z_2$ is computed then one of the three constants in every term will disappear leaving products of two secret constants as follows:

$$Z_1 = X_\alpha Z_\alpha^{-1} y X_1$$

$$Z_2 = X_\beta Z_\beta^{-1} y X_2$$

This is what results with the pre-multiplication, and the attacker faces the multiplication of two secret values.

Similarly, if two encoded values $x = +X_\alpha X_1 + X_\beta X_2$ and $y = Y_\alpha Y_1 + Y_\beta Y_2$ are multiplied where the resulting product z is left plain, then this results in the products of two secret constants:

$$z = X_\alpha Y_\alpha X_1 Y_1 + X_\beta Y_\alpha X_2 Y_1 + X_\alpha Y_\beta X_1 Y_2 + X_\beta Y_\beta X_2 Y_2$$

This is the result with the post-multiplication. So by starting and ending the function with multiplications with encoded values, it is realized that secret values stay combined and never appear in isolation.

Figure 6:
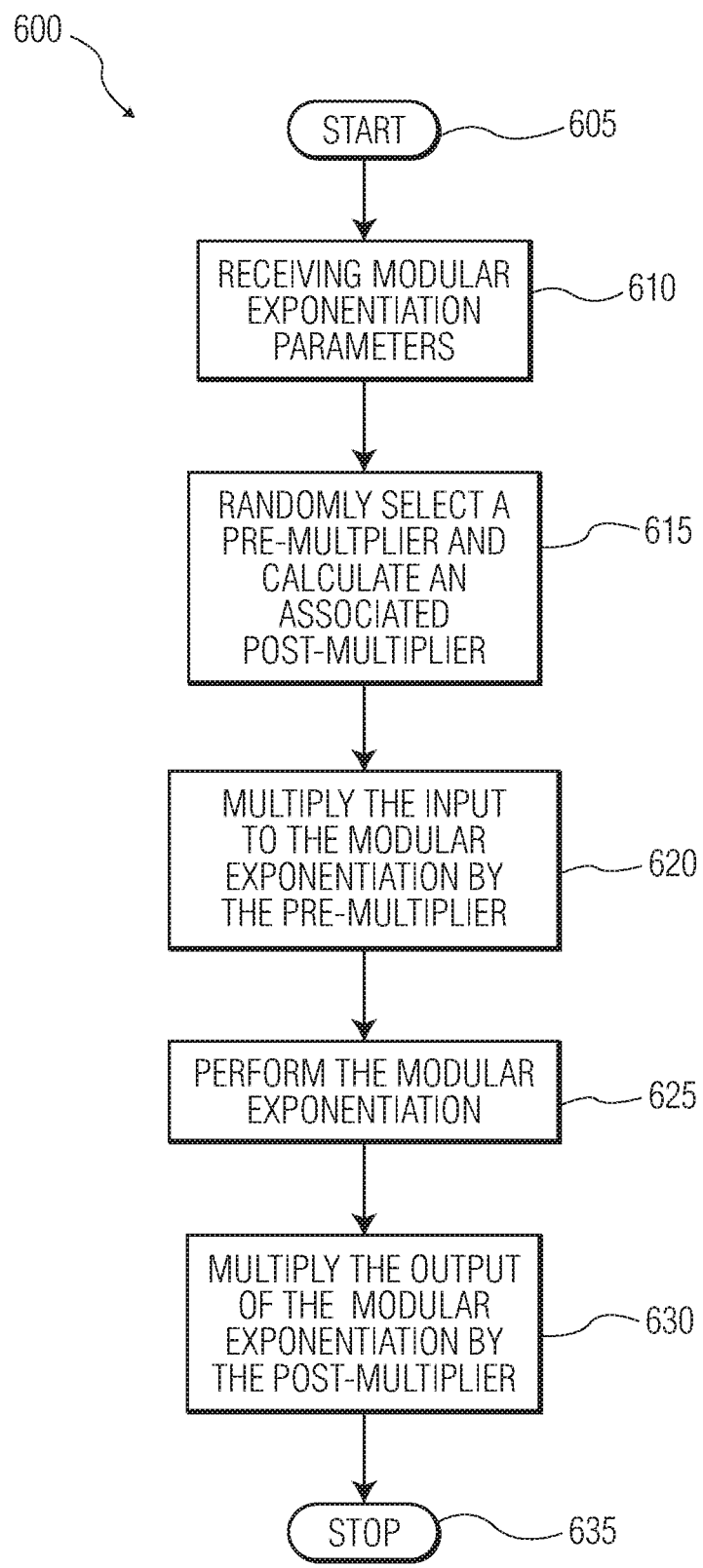
FIG. 6 illustrates a method of obscuring the input and output of a modular exponentiation function.

FIG. 6 illustrates a method of obscuring the input and output of a modular exponentiation function. The method 600 may begin at 605. Next, the method may receive modular exponentiation parameters 610. The modular exponentiation parameters may include the secret exponent e and the modulo value m. Then the method 600 may randomly select a pre-multiplier and calculate an associated post-multiplier 615. As discussed above the random pre-multiplier is selected to be co-prime with m. Further, the post multiplier may be calculated as described above as $y = x^{-e}$ mod m, where x is the pre-multiplier, e is the secret key, and m is the modulus. Next, the method 600 multiplies the input to the modular exponentiation by the pre-multiplier 620. Then the method 600 performs the modular exponentiation on the product of the pre-multiplier and the input to the modular exponentiation 625. The method 600 then multiplies the output of the modular exponentiation function by the post-multiplier to obtain the plain output value 630. The method 600 then ends at 635.

For elliptic curve point multiplication a similar operation may be used. In calculating the point multiplication projective coordinates are used. Here the affine input coordinate (X, Y) of the point P is mapped to projective coordinate (X, Y, 1) at the input. Instead of this, the affine coordinate may be mapped to (X*a, Y*a, a) where a is a random encoded constant. By multiplying the inputs X and Y with a constant a, the pre-multiplication is realized.

Similarly, at the output of the function a projective coordinate (X, Y, Z) is produced which is decoded to plain values and converted to an affine coordinate (X/Z, Y/Z). The division happens on plain values, because it cannot be performed on encoded values. Instead of computing (X, Y, Z), the values (X*b, Y*b, Z*b) are computed where b is again a random encoded constant. The three multiplies multiply two encoded values and produce plain values. After this the division takes place to convert the values to affine coordinates where the b values are canceled out: ((X*b)/(Z*b), (Y*b)/(Z*b))=(X/Z, Y/Z). In this case a is the pre-multiplier and b is the post-multiplier and there is no relation between them.

Figure 7:
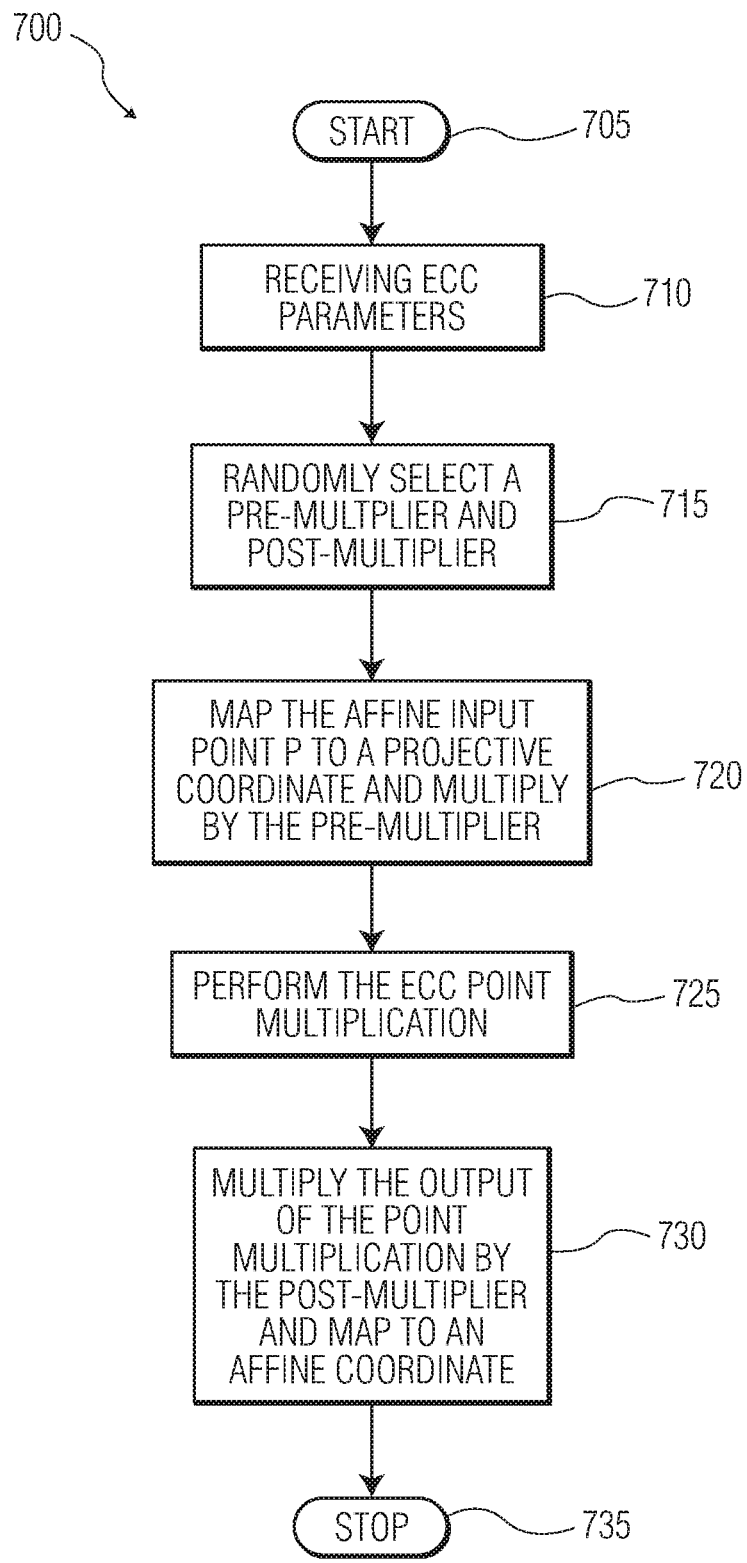
FIG. 7 illustrates a method of obscuring the input and output of an ECC point multiplication function.

FIG. 7 illustrates a method of obscuring the input and output of an ECC point multiplication function. The method 700 may begin at 705. Next, the method may receive ECC parameters 710. The ECC parameters may include the secret multiplier d and the prime of the elliptic curve. Then the method 700 may randomly select a pre-multiplier and post-multiplier 715. Next, the method 700 maps the affine input point P to a projective coordinate and the multiplies the mapped point by the pre-multiplier 720. Then the method 700 performs the ECC point multiplication on the mapped point 725. The method 700 then multiplies the output of the of the point multiplication by the post-multiplier and maps the output back to an affine coordinate 730. The method 700 then ends at 735.

It is noted that while pre-multiplication and post-multiplication for ECC using projective coordinates was described, the idea is applicable to other coordinate systems as well.

A method according to the embodiments of the invention may be implemented on a computer system as a computer implemented method. Executable code for a method according to the invention may be stored on a computer program medium. Examples of computer program media include memory devices, optical storage devices, integrated circuits, servers, online software, etc. Such a computer system, may also include other hardware elements including storage, network interface for transmission of data with external systems as well as among elements of the computer system.

In an embodiment of the invention, the computer program may include computer program code adapted to perform all the steps of a method according to the invention when the computer program is run on a computer. Preferably, the computer program is embodied on a non-transitory computer readable medium.

A method of creating the obscured code of a white-box implementation according to the invention may be implemented on a computer as a computer implemented method. Executable code for a method according to the embodiments may be stored on a computer program medium. In such a method, the computer program may include computer program code adapted to perform all the steps of the method when the computer program is run on a computer. The computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of obscuring an input and output of implementing an elliptic curve cryptography (ECC) point multiplication function, comprising:
   receiving, by a processor, ECC parameters including an input point P and a prime of the elliptic curve;
   generating randomly, by the processor, a pre-multiplier;
   generating randomly, by the processor, a post-multiplier;
   mapping, by the processor, the input point P in an affine coordinate into a projective coordinate $(X_i, Y_i, 1)$, wherein $X_i$, and $Y_i$ are encoded values;
   multiplying, by the processor, the mapped input point P by the pre-multiplier as $(X_i*a, Y_i*a, a)$ where a is the pre-multiplier;
   performing, by the processor, the ECC point multiplication function;
   multiplying, by the processor, an output of the ECC point multiplication function by the post-multiplier as $(X_o*b, Y_o*b, Z_o*b)$ where b is the post-multiplier and $(X_o, Y_o, Z_o)$ is the output of the ECC point multiplication; and
   mapping, by the processor, the multiplied output of the ECC point multiplication function to the affine coordinate as $(X_o/Z_o, Y_o/Z_o)$,
   wherein multiplying the mapped input point P by the pre-multiplier, performing the ECC point multiplication function, and multiplying the output of the ECC point multiplication function by the post-multiplier are split variable operations, and wherein the pre-multiplier and the post-multiplier are both split variable encoded values, wherein starting the ECC point multiplication function with a pre-multiplier and ending the ECC point multiplication function with a post-multiplier ensures the encoded values do not become explicit or appear in isolation in a white-box implementation in the processor, making the processor more secure.

2. The method of claim 1, wherein the prime of the elliptic curve is used as a modulus in the split variable operations.

3. The method of claim 1, wherein split variables are determined using first and second secret splitting multiplicative values and a modulus value.

4. The method of claim 3, wherein the split variables are further determined using a secret splitting additive value.

5. The method of claim 4, wherein the split variable operations are arranged so that none of the splitting secret multiplicative values and the secret splitting additive value are observable to an attacker.

6. The method of claim 1, wherein the method of obscuring the input and output of implementing an ECC point multiplication function further comprises obscuring software code in a compiler.

\* \* \* \* \*